US006221977B1

(12) United States Patent
Park et al.

(10) Patent No.: US 6,221,977 B1
(45) Date of Patent: Apr. 24, 2001

(54) BIODEGRADABLE ALIPHATIC POLYESTER GRAFTED WITH POLYETHER AND A PROCESS FOR PREPARING THE SAME

(75) Inventors: Jung-Ki Park, Taejon; Kuk Young Cho, Kwachon; Chang-Hyeon Kim, Taejon, all of (KR)

(73) Assignee: Korea Advanced Institute of Science nad Technology, Taejon (KR)

( * ) Notice: Subject to any disclaimer, the term of this patent is extended or adjusted under 35 U.S.C. 154(b) by 0 days.

(21) Appl. No.: 09/405,753

(22) Filed: Sep. 27, 1999

(30) Foreign Application Priority Data

Dec. 26, 1998 (KR) .................................................. 98-58890

(51) Int. Cl.$^7$ ......................... C08G 63/08; C08G 63/06; C08G 65/08
(52) U.S. Cl. ......................... 525/408; 525/407; 525/533; 528/354; 528/357; 528/359
(58) Field of Search .................................... 525/407, 408, 525/533; 528/354, 357, 359

(56) References Cited

U.S. PATENT DOCUMENTS

| | | |
|---|---|---|
| 3,645,986 | * 2/1972 | Rifi . |
| 5,162,174 | 11/1992 | Andrei et al. . |
| 5,548,035 | 8/1996 | Kim et al. . |
| 5,702,717 | 12/1997 | Cha et al. . |
| 6,133,366 | * 10/2000 | Thetford . |

OTHER PUBLICATIONS

Macromolecules, vol. 30, "Synthesis and Characterization of [L]–Lactide–Ethylene Oxide Multiblock Copolymers", pp. 4295–4301 (1977).

Macromolecules, vol. 31, "Graft Polymerization of L–Lactide on Pullulan through the Trimethylsilyl Protection method and Degradation of the Graft Copolymers", pp. 4662–4665 (1998).

Journal of Polymer Science: Part A: Polymer Chemistry, vol. 37, "Synthesis and Properties of Multiblock Copolymers Consisting of Poly (L–lactic acid) and Poly (oxypropylene–co–oxyethylene) Prepared by Direct Polycondensation", pp. 1513–1521 (1999).

Macromolecules, vol. 31, "Star–shaped Poly(ether–ester) Block Copolymers: Synthesis, Characterization, and Their Physical Properties", pp. 8766–8774 (1998).

The 5$^{th}$ International Symposium on Polymers for Advanced Technologies, "New Biodegradable Polymers for Drug Delivery", Aug. 31–Sep. 5, 1999.

The 4$^{th}$ Asia–Pacific Conference on Medical & Biological Engineering, In Vitro BSA Release of the Microparticle from Blend of Poly(D,L–Lactic–co–Glycolic acid) and Novel Polymer Poly (L–Lactide)–g–Poly (Ethylene Glycol), Sep. 12–15, 1999.

* cited by examiner

Primary Examiner—David J. Buttner
(74) Attorney, Agent, or Firm—Knobbe, Martens, Olson & Bear, LLP

(57) ABSTRACT

The present invention provides a process for preparing biodegradable aliphatic polyester grafted with polyether which comprises a step of ring opening polymerization of a hydrophilic monomer of epoxide-substituted ethylenegly-colmethylether oligomer or ethyleneglycol oligomer, and a biocompatible cyclic monomer forming polymer backbone with the said monomer, and a non-toxic biodegradable polymer prepared therefrom. In accordance with the invention, the graft ratio and molecular weight of polyether in the biodegradable aliphatic polyester can be easily controlled, and the hydrophlicity and crystallinity are also regulated thereby. The biodegradable polymer of the invention has features of minimized protein adhesion and superior softness, due to its hydrophilic side-chain. Accordingly, it can be applied as biomedical polymers such as the matrices for drug delivery system, suture thread, or bioabsorbable and water-soluble polymers.

8 Claims, 1 Drawing Sheet

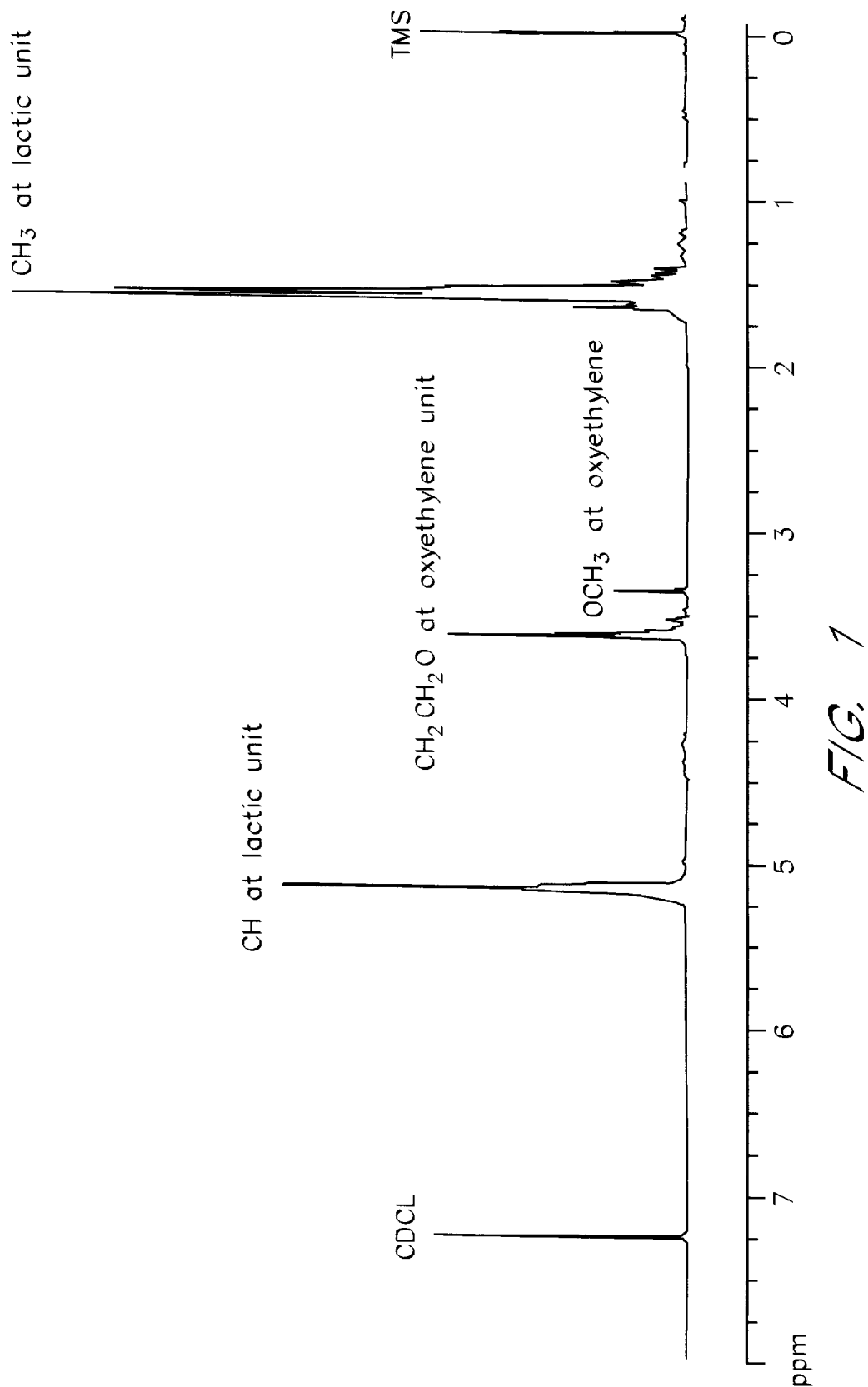

BIODEGRADABLE ALIPHATIC POLYESTER GRAFTED WITH POLYETHER AND A PROCESS FOR PREPARING THE SAME

FIELD OF THE INVENTION

The present invention relates to a biodegradable aliphatic polyester grafted with polyether and a process for preparing the same, more specifically, to a process for preparing biodegradable aliphatic polyester grafted with polyether which comprises a step of ring opening polymerization of a hydrophilic monomer of epoxide-substituted ethylenegly-colmethylether oligomer or ethyleneglycol oligomer, and a biocompatible cyclic monomer forming polymer backbone with the said monomer, and a non-toxic biodegradable polymer prepared therefrom.

BACKGROUND OF THE INVENTION

In recent years, the demands on biomaterials essential to the biomedical industries have been increased as a result of a rapid advance in public welfare, health improvement, and medical science. In particular, needs have continued to exist for the development of biomaterials which have specific applications in various areas such as biosenser, biotechnology, materials for orthopedics, sanitary supplies, matrices for drug delivery system and artificial organs. The biomaterials cover metals, ceramics and polymers which can be applied to the said areas, and among them, polymers having the advantages of lightness and flexibility have been regarded as a representative material.

In general, the polymers used for biomedical materials are classified depending on their degradation properties into biodegradable polymer and nondegradable polymer. Non-degradable polymer has been used as surgery materials, although it has a disadvantage of undergoing removal after surgery. Still, biodegradable polymer has merit over the nondegradable polymer in a sense that it can be easily degraded by water or enzyme.

Studies on the various polymers which can be used for medical purpose have been actively carried out, since a biodegradable polymer with polylactide and polyglycolic acid was approved in FDA. However, there are strong reasons for exploring alternative biomaterials in order to meet various mechanical properties for specialized medical purpose such as materials for orthopedics, implants and matrices for drug delivery system while possessing a biocompatible character.

Under the circumstances, biocompatible aliphatic polyesters, such as, polylactide, polyglycolide and polycaprolactone have been suggested as promising biodegradable polymers. However, the said polymers tend to adhere to cells or proteins due to their low hydrophilicity and cause numerous problems when they are applied to a living body. Accordingly, in order to attenuate the said hydrophobic nature, new approaches to the copolymerization of hydrophilic polyether have been made in the art.

For example, Lee et al. disclosed that the protein adhesion was significantly suppressed when the hydrophilic polymer, particularly with, polyethylene oxide is located on the side chain(see: J. H. Lee et al., J. Biomed. Materials Res., 23:351(1989)). Furthermore, a ring-opening polymerization of L-lactide and ethyleneoxide was successfully carried out to obtain a random copolymer by using various catalysts (see: X. Chen et al., Macromolecules, 30:4295(1997)), although it is very difficult to regulate the amount of monomers, since the ratio of product is not correlated with molar ratio of the added monomers. And further, researches on the block-copolymers of monomer such as caprolactone, lactide, and glycolide or homopolymeric blending with the copolymers have been progressed in the art.

On the other hand, U.S. Pat. No. 5,741,881 discloses that blood compatibility was dramatically improved by grafting polyethyleneoxide onto the side chain of polyurethane, although it turned out unsuitable for biomedical materials owing to its abrasive effect and undegradable property in a living body. Furthermore, U.S. Pat. No. 5,548,035 teaches that: polyethyleneglycol and polylactide having various terminal groups, copolymer of polylactide-polyglycolide or polycaprolactone are copolymerized to give multi-block copolymers, which show non-toxic and biodegradable properties; and, therefore, they can be successfully used for matrices for drug delivery system.

Besides, aliphatic polyester having a structure to maximize the effect of polyether substitution by positioning hydrophilic groups on the surface, which is suitable for biomedical polymers, have been successively considered in the art.

SUMMARY OF THE INVENTION

The present inventors have made an effort to prepare a non-toxic biodegradable polymer having abrasion-resistance and blood-compatibility, whereby protein adhesion and abrasive effect in contact with cells are significantly reduced, and they found that: a biodegradable polymer which is prepared by ring-opening polymerization of a hydrophilic polyether of polyethyleneglycolmethylether or polyethyleneglycol having reduced protein adhesion, and a biocompatible aliphatic polyester such as polylactide, polyglycolide, and polycaprolactone copolymer, has a superior surface character of softness owing to its characteristic polyether positioning on the surface.

A primary object of present invention is, therefore, to provide a process for preparing a biodegradable aliphatic polyester grafted with polyether.

The other object of the invention is to provide a non-toxic biodegradable polymer prepared by the said process.

BRIEF DESCRIPTION OF DRAWINGS

The above and the other objects and features of the present invention will become apparent from the following descriptions given in conjunction with the accompanying drawings, in which:

FIG. 1 is $^1$H-NMR(nuclear magnetic resonance) spectrum of a biodegradable polymer prepared in Example 5.

DETAILED DESCRIPTION OF THE INVENTION

In accordance with the present invention, an aliphatic polyester grafted with polyether is prepared by ring-opening polymerization of a hydrophilic monomer such as epoxide-substituted polyethyleneglycolmethylether or polyethyleneglycol having a number molecular weight ranging from 120 to 1,000, and a polymeric backbone containing one or more of monomers such as lactide, glycolide, caprolactone, β-propiolactone, γ-butyrolactone, ethyleneoxide and propylene oxide, in the presence of a catalyst such as $Sn(Oct)_2$, $Al(i-Bu)_2$ .0.5 $H_2O$ and $AlEt_3$. 0.5 $H_2O$ or a combination thereof. The present invention also provides a process for preparing an aliphatic polyester grafted with polyether by ring-opening polymerization of a monomeric backbone such as lactide, glycolide, caprolactone, β-propiolactone, γ-butyrolactone, ethyleneoxide and propyleneoxide, and a compound having cyclic epoxide with functional group, followed by adding polyethyleneglycolmethylether or polyethyleneglycol having a molecular weight ranging from 120 to 8,000, in the presence of a catalyst.

The biodegradable aliphatic polyester prepared by the invention, has an advantage that molecular weight and graft ratio of polyether to be grafted into the backbone of a biodegradable aliphatic polyester, can be easily controlled and hydrophilicity and crystallinity can also be regulated thereby.

The present invention further provides aliphatic polyesters which comprise 1 to 50 wt % of grafted monomer and 50 to 99 wt % of monomeric backbone, which are prepared by the above processes. The polymers have a structure of hydrophilic polyethyleneglycol grafted to a biodegradable aliphatic polyester positioning on the surface of the material, which, in turn, minimizes protein adhesion and abrasive effect in contact with cells by its non-toxic and biodegradable properties.

The present invention is further illustrated in the following examples, which should not be taken to limit the scope of the invention.

EXAMPLE 1

Preparation of a Monomer of Epoxide-Substituted polyethyleneglycolmethylether(I)

In order to prepare a hydrophilic monomer of epoxide-substituted polyethyleneglycolmethylether, 6.492 g of polyethyleneglycolmethylether(hereinafter, referred to as 'PEGME' for convenience) having a number average molecular weight of 120 and 6.484 g of sodium hydroxide were placed in Elrenmeyer flask and then, 10 g of epichlorohydrin was charged into the flask by a drop-wise addition for 1.5 hr. Then, substitution of hydrogen of PEGME by sodium, which is confirmed by color change into yellow, was carried out to obtain a monomer of cyclic epoxide-substituted PEGME. After completion of the above reaction, acetonitrile was added to remove the precipitates of sodium chloride and sodium hydroxide. All of the above reactions were carried out in a glove box, and a light-browny monomeric solution(epoxide terminated PEGME, hereinafter, referred to as 'ETPEGME' for convenience) finally got obtained, which is summarized below.

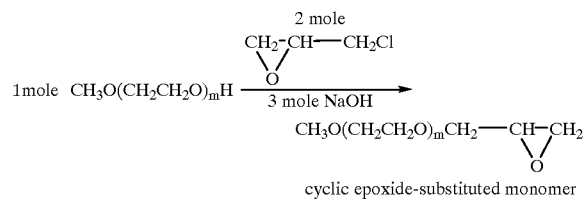

EXAMPLE 2

Preparation of a Monomer of Epoxide-Substituted polyethyleneglycolmethylether(II)

ETPEGME was prepared in an analogous manner as in Example 1, except for employing 20 g of PEGME having a number average molecular weight of 350, 6.852 g of sodium hydroxide and 10.57 g of epichlorohydrin.

EXAMPLE 3

Preparation of aliphatic polylactide grafted with polyethyleneglycolmethylether(I)

To prepare an aliphatic polylactide polymer grafted with PEGME, 3.380 g of L-lactide and 1 g of ETPEGME 350(wherein, the number means average molecular weight of PEGME used for preparing a monomer) prepared in Example 2, were charged into a round-bottomed flask of 10 ml and then, 18 mg of stannous 2-ethylhexanoate(Sn(Oct)$_2$), was added as a catalyst in a glove box. Then, the mouth of the flask was plugged with a stopper and sealed with a paraffin film in order not to allow air influx. After pulling out from the glove box, the flask was taken in an oil-incubator adjusted to 100° C., and proceeded the reaction for approximately 26 hrs. The resultant solid product was solubilized in toluene, followed by precipitation into a polymer with petroleum ether. Then, remaining solvent was subsequently dried off, and then the precipitates were washed 3 times with distilled water to obtain powdered graft-polymer having a graft ratio of 5% and a number average molecular weight of 10,000(wherein, the graft ratio is a percentage of occupation of ETPEGME in polymeric backbone). FIG. 1 is an analytical result of $^1$H-NMR spectrum of a grafted polymer prepared by the said process. The process for preparing the titled polymer is summarized as below:

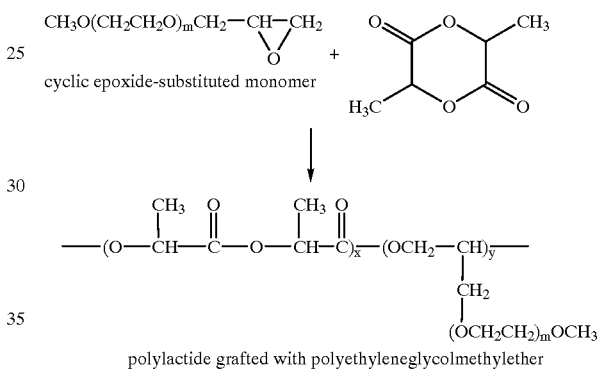

polylactide grafted with polyethyleneglycolmethylether

EXAMPLE 4

Preparation of Aliphatic Polylactide Grafted with polyethyleneglycolmethylether(II)

A graft polymer having a graft ratio of 7% and a number average moleculer weight of 8,000 was prepared in an analogous manner as in Example 3, except for employing 0.977 g of ETPEGME 120 prepared in Example 1, 7.37 g of L-lactide, and 18 mg of Sn(Oct)$_2$.

EXAMPLES 5 to 12

Preparation of aliphatic polylactide grafted with polyethyleneglycolmethylether(III)

Graft-polymers having a graft ratio of 10% were prepared in an analogous manner as in the above Examples, by employing the various monomers, molecular weight of PEGME, catalysts and molar ratios described in Table 1 below.

TABLE 1

| Example | Main backbone Monomer (A,B) | Molecular weight of PEGME on Side chain | Catalyst | Molar ratio (A:B:C) | Mw (number average of molecular weight) |
|---|---|---|---|---|---|
| 5 | A: L-lactide | 120 | $Sn(Oct)_2$ | 7:0:3 | 25,000 |
| 6 | A: L-lactide | 120 | $Sn(Oct)_2$ | 5:0:5 | 12,000 |
| 7 | A: L-lactide B: glycolide | 120 | $Sn(Oct)_2$ | 4.6:4.5:1 | 32,000 |
| 8 | A: L-lactide B: caprolactone | 350 | $AlEt_3 \cdot 0.5\ H_2O$* | 6:2:2 | 30,000 |
| 9 | A: D,L-lactide | 120 | $Sn(Oct)_2$ | 7:0:3 | 34,000 |
| 10 | A: caprolactone | 120 | $Sn(Oct)_2$ | 9:0:1 | 52,000 |
| 11 | A: caprolactone | 350 | $AlEt_3 \cdot 0.5\ H_2O$ | 9:0:1 | 48,000 |
| 12 | A: D,L-lactide B: caprolactone | 350 | $Al(i-Bu)_3 \cdot 0.5H_2O$* | 4.5:4.5:1 | 22,000 |

*: $AlEt_3 \cdot 0.5\ H_2O$ and $Al(i-Bu)_3 \cdot 0.5\ H_2O$ are catalysts, which are prepared by modification of trimethylaluminum and triisobutylaluminum in accordance with Chen et al's method (see: X. Chen et al., Macromolecules, 30:4295(1997)).

*: $AlEt_3$. 0.5 $H_2O$ and $Al(i-Bu)_3$. 0.5 $H_2O$ are catalysts, which are prepared by modification of trimethylaluminum and triisobutylaluminum in accordance with Chen et al's method(see: X. Chen et al., Macromolecules, 30:4295 (1997)).

EXAMPLE 13

Preparation of Aliphatic Polylactide Grafted with polyethyleneglycolmethylether(IV)

In order to prepare an aliphatic polylactide polymer grafted with PEGME in a different way, 3.380 g of L-lactide and 1 g of epichlorohydrin with 18 mg of $AlEt_3.0.5\ H_2O$ as a catalyst, were charged in a round-bottomed flask of 10 ml, dled in a glove box. Then, the mouth of the round-bottomed flask was plugged with a stopper and sealed with a paraffin film in order not to allow air influx. After pulling out from the glove box, the flask was taken into an oil-incubator adjusted to 100° C. and proceeded the reaction for 26 hrs. And then, the polymer thus obtained was dissolved in organic solvent such as toluene or chloroform, and subjected to a reaction between hydroxyl-group of PEGME and chloride of epichlorohydrin by adding PEGME having a molecular weight of 120, finally to give a graft-modified polymer.

EXAMPLE 14

Preparation of Aliphatic Polylactide Grafted with polyethyleneglycol

An aliphatic polylactide polymer grafted with polyethyleneglycol was prepared in an analogous manner as in Example 13, except for employing polyethyleneglycol having a number average molecular weight of 300 instead of PEGME.

As clearly described and demonstrated as above, the present invention provides a biodegradable aliphatic polyester grafted with polyether, and a process for preparing the same. In accordance with the invention, the graft ratio and molecular weight of polyether in the biodegradable aliphatic polyester can be easily controlled, and the hydrophlicity and crystallinity are also regulated thereby. The biodegradable polymer of the invention has features of minimized protein adhesion and superior softness, due to its hydrophilic sidechain. Accordingly, it can be applied as biomedical polymers such as the matrices of drug delivery system, suture thread, or bioabsorbable and water-soluble polymers.

What is claimed is:

1. A process for preparing aliphatic polyester grafted with polyether, comprising: mixing an epoxide-substituted ethyleneglycolmethylether oligomer with a molecular weight of about 120 to 1000 or an epoxide substituted ethyleneglycol oligomer with a molecular weight of about 120 to 1000, together with a monomer selected from the group consisting of: lactide, glycolide, caprolactone, β-propiolactone and γ-butyrolactone, in the presence of a catalyst thereby effecting ring-opening polymerization.

2. The process for preparing aliphatic polyester grafted with polyether of claim 1, wherein the catalyst is selected from the group consisting of: $Sn(Oct)_2$, $Al(I-Bu)_3$. $0.5H_2O$, $AlEt_3$. $0.5H_2O$ and a combination thereof.

3. An aliphatic polyester grafted with polyether prepared by the process of claim 1.

4. The aliphatic polyester grafted with polyether of claim 3 wherein said polyester grafted with polyether comprises: 1 to 50 wt % of an epoxide-substituted ethyleneglycolmethylether oligomer with a molecular weight of about 120 to 8000 or an ethyleneglycol oligomer with a molecular weight of about 120 to 1000; and, 50 to 99 wt % of a monomer selected from the group consisting of lactide, glycolide, caprolactone, β-propiolactone and γ-butyrolactone.

5. A process for preparing aliphatic polyester grafted with polyether, comprising the steps of: polymerizing a monomer selected from the group consisting of lactide, glycolide, caprolactone, β-propiolactone and γ-butyrolactone, with a compound having cyclic epoxide with functional group; and, adding an ethyleneglycolmethylether oligomer or an ethyleneglycol oligomer wherein the molecular weight of the oligomer ranges from 120 to 8000.

6. The process for preparing aliphatic polyester grafted with polyether of claim 5, wherein the compound having cyclic epoxide and functional group is epichlorohydrin.

7. An aliphatic polyester grafted with polyether prepared by the process of claim 5.

8. The aliphatic polyester grafted with polyether of claim 7 wherein said polyester grafted with polyether comprises: 1 to 50 wt % of an epoxide-substituted ethyleneglycolmethylether oligomer with a molecular weight of about 120 to 8000 or an ethyeleneglycol oligomer with a molecular weight of about 120 to 8000; and, 50 to 99 wt % of a monomer selected from the group consisting of lactide, glycolide, caprolactone, β-propiolactone and γ-butyrolactone.

* * * * *